United States Patent [19]

Miyashita et al.

[11] Patent Number: 5,684,890
[45] Date of Patent: Nov. 4, 1997

[54] THREE-DIMENSIONAL REFERENCE IMAGE SEGMENTING METHOD AND APPARATUS

[75] Inventors: Masanobu Miyashita; Kenji Okajima, both of Tokyo, Japan

[73] Assignee: NEC Corporation, Tokyo, Japan

[21] Appl. No.: 394,278

[22] Filed: Feb. 24, 1995

[30] Foreign Application Priority Data

| Feb. 28, 1994 | [JP] | Japan | 6-029335 |
| Aug. 5, 1994 | [JP] | Japan | 6-184785 |
| Oct. 31, 1994 | [JP] | Japan | 6-266511 |

[51] Int. Cl.$^6$ .............. G06K 9/00; G06K 9/36
[52] U.S. Cl. .............. 382/154; 382/280; 382/255
[58] Field of Search .............. 382/154, 153, 382/173, 190, 191, 195, 282, 209, 216, 236, 260, 261, 279, 280, 291, 242, 106, 255, 302, 278; 364/822; 395/119; 340/815.47; 348/20, 47, 207

[56] References Cited

U.S. PATENT DOCUMENTS

| 4,842,411 | 6/1989 | Wood | 356/376 |
| 5,179,441 | 1/1993 | Anderson et al. | 348/43 |
| 5,193,124 | 3/1993 | Subbarao | 382/255 |
| 5,537,669 | 7/1996 | Evans et al. | 382/280 |

FOREIGN PATENT DOCUMENTS

| 2156387 | 6/1990 | Japan | G06K 9/62 |

OTHER PUBLICATIONS

K. Fushima; "A Neural Network Model for Selective Attention in Visual Pattern Recognition"; Biological Cybernetics, Springer–Verlag 1986, pp. 5–15.

K. Fukushima et al.; "Recognition and Segmentation of Connected Characters with Selective Attention"; Neural Networks, vol. 6, 1993, pp. 33–41.

D. Marr; "Vision"; W.H. Freeman and Company, 1982; pp. 110–120.

D. Marr; "Vision"; W.H. Freeman and Company, 1982; pp. 120–159.

H.K. Nishihara; "Practical Real–Time Imaging Stereo Matcher"; Optical Engineering, vol. 23, No. 5, Sep./Oct. 1984; pp. 536–545.

Y. Ohta; "Stereo by Intra–and Inter–Scanline Search Using Dynamic Programming" IEEE Transactions on Pattern Analysis and Machine Intelligence, vol. PAMI–7, No. 2, Mar. 1985; pp. 139–154.

*Primary Examiner*—Leo Boudreau
*Assistant Examiner*—Wenpeng Chen
*Attorney, Agent, or Firm*—Whitham, Curtis, Whitham & McGinn

[57] ABSTRACT

The images of an object equivalent to those obtained when as object is viewed respectively by the right and left eyes are subdivided into small areas with overlaps allowed therebetween and are Fourier transformed to achieve a local Fourier transform for the images. Phase difference of Fourier transforms is obtained according to the right and left local Fourier transform images of a reference image which is stored beforehand in a storage memory. Alternatively, a Fourier transform power spectrum is obtained. Disparity is represented in terms of a phase difference or in the form of a Fourier transform power spectral pattern. According to either one of the above results, and on the basis of a local Fourier transform of an input image including the reference image, an identical object image is estimated. For the image, a local inverse Fourier transform is effected such that geometric mean values are attained between the right and left images so as to segment an image matching the reference image and, also, with respect to disparity.

17 Claims, 7 Drawing Sheets

FIG. 3A
PRIOR ART
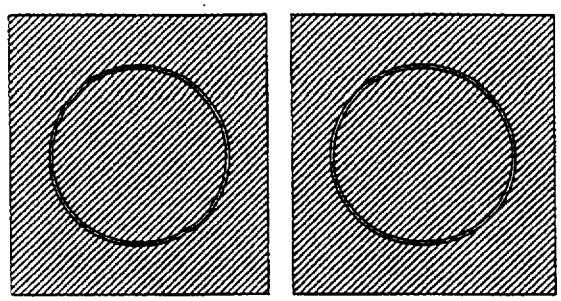
FIG. 3B
PRIOR ART
FIG. 3C
PRIOR ART
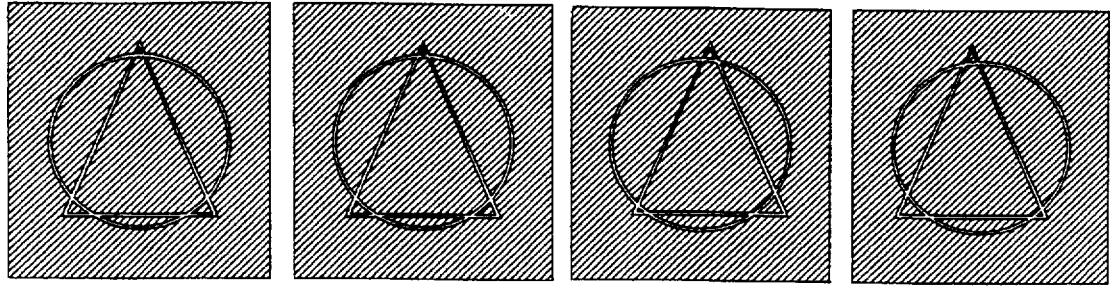
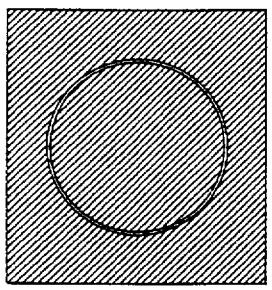 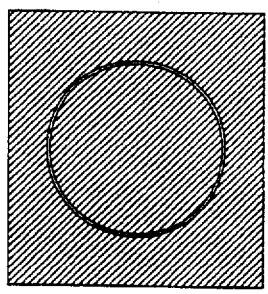 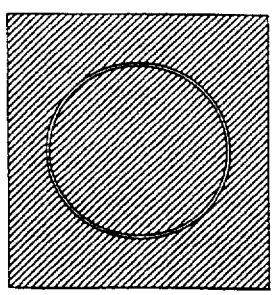 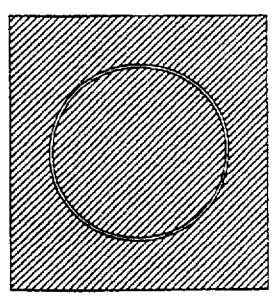

F I G. 5
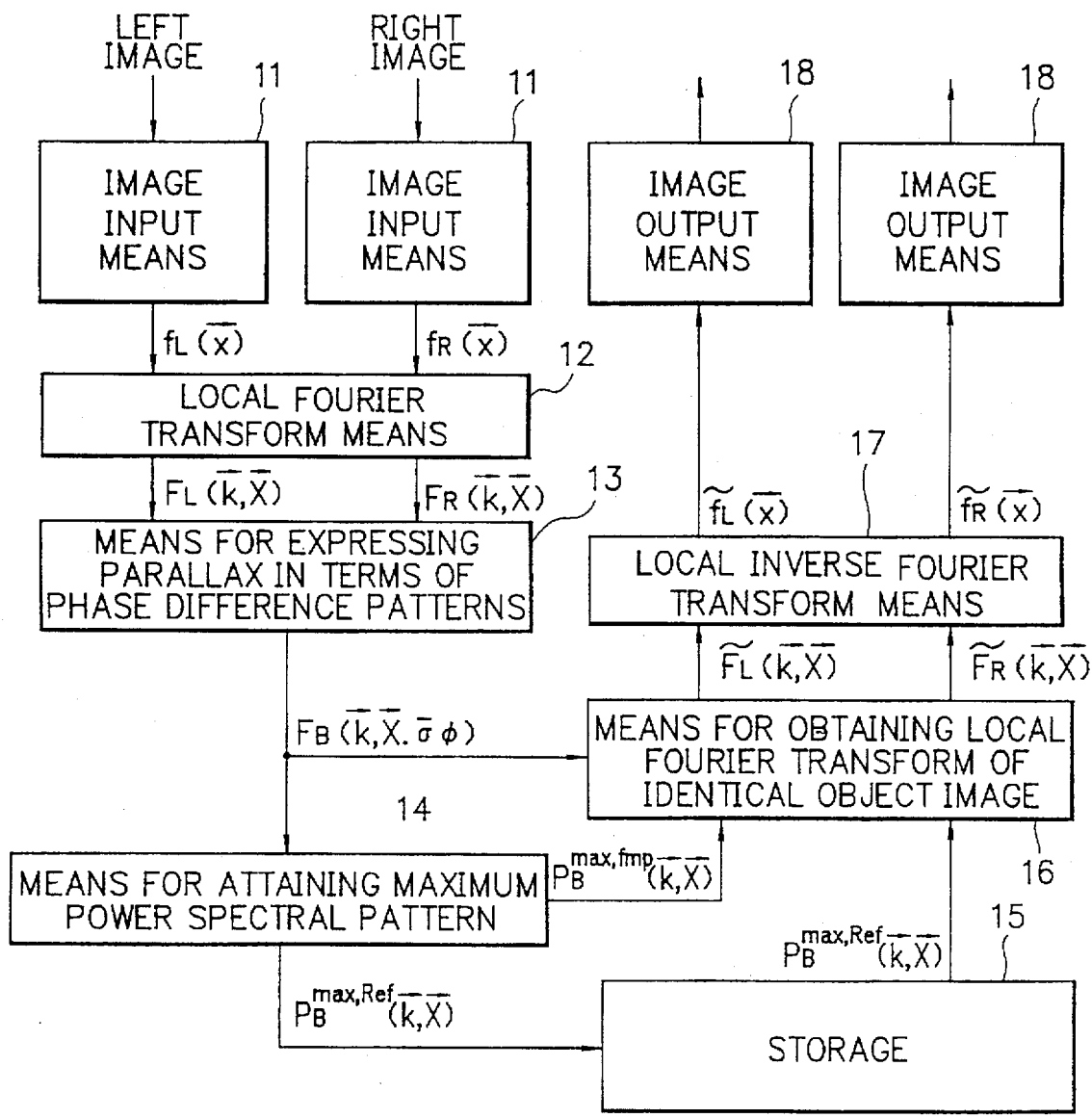

F I G. 7A
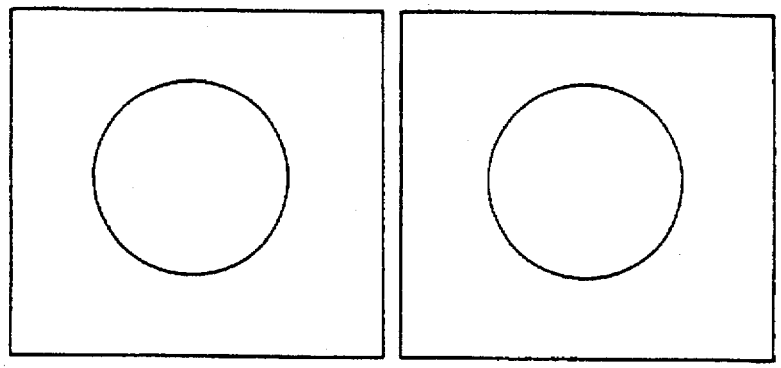
F I G. 7B
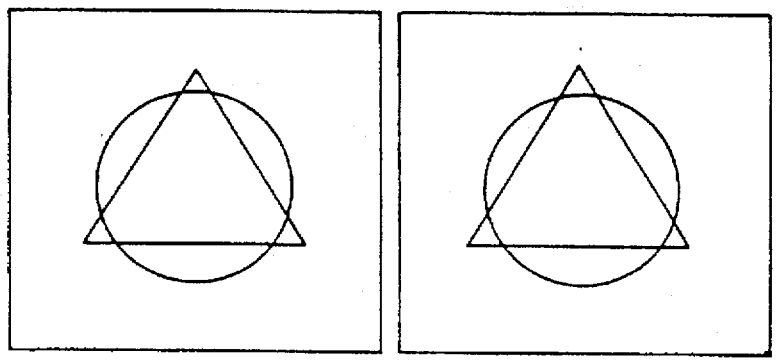
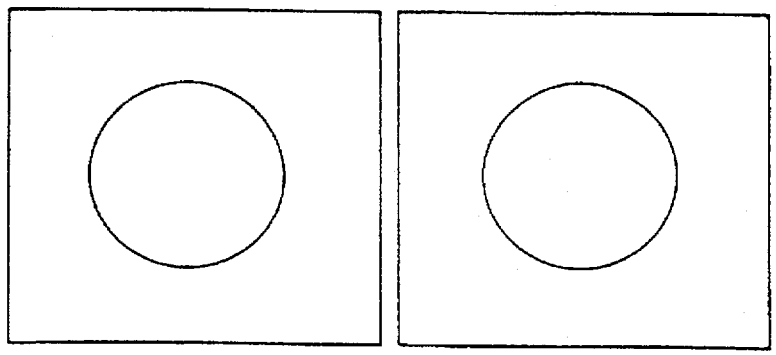

THREE-DIMENSIONAL REFERENCE IMAGE SEGMENTING METHOD AND APPARATUS

BACKGROUND OF THE INVENTION

The present invention relates to a method of and an apparatus for segmenting from a three-dimensional input image only a three-dimensional reference image stored beforehand.

1. Description of the Related Art

According to a conventional method of segmenting a reference image from an input image (for example, Japanese Patent Laid-Open No. Hei-2-156387 entitled "Video Signal Processing Method"), the input image is partitioned into small domains with overlapped portions allowed between the domains so as to conduct a Fourier transform for each domain. The segmented image is collated with the reference images while achieving the segmentation. Consequently, even when the input image includes images other than the reference image, it is possible to correctly segment the reference image from the input image. In psychology, the operation to obtain a reference image from an input image has been known as segmentation of objects in which selective attention is paid to an input image having at least two images to attain a particular image therefrom so as to discriminate the selected image from the other images. To execute selective attention and segmentation on a computer, K. Fukushima et al., have proposed a model using a neural network. Reference is to be made to Fukushima K., Biol. Cybern. 55, 5-15 (1986)" and "Fukushima K. and Imagawa T., Neural Networks, Vol. 6, 33-41 (1993).

The above-referenced Fukushima et at. ("Fukushima") method is characterized by employing a hierarchic neural network called "neocognitron". An image as the target of segmentation is inputted beforehand to the network, namely, learning is conducted for the image such that the network outputs a robust output for the image with certain tolerance of distortion, positional shift, and difference in size. Subsequently, an input image including an image used for the learning is supplied to the network. Information of an image recalled in response to the input image is sent from an upper layer to a lower layer near the input level. Moreover, template information of an image as the target of segmentation is produced by input-weighted learning through lower-layer neurons according to the input image and information of the recalled image, thereby segmenting only the objective image from the input image. In addition, according to this method, since there is learning conducted with respect to the reference image as above, even when the input image is different from the memorized image to some extent, the segmentation can be appropriately carried out.

Although there has not been proposed any method of segmenting from an input image a reference image in which three-dimensional (3D) images can be directly treated, there is a known technology in which images equivalent to pictures obtained when an object is viewed respectively by the right and left eyes of a human are processed to restore a three-dimensional contour of the object. Because of this art a quasi-three dimensional or image can be segmented from a input image by comparing a solid 3D contour reconstructed from a prior stored reference with a solid contour restored according to the input image. Description will next be given of the technology to restore a quasi-3D object shape according to the images equivalent to pictures obtained when an object is viewed respectively by the right and left eyes.

A method in which a random-dot stereogram is used as an input image to reconstruct a solid image sensed by a human has been proposed by Marr et al in pages 111 to 122 of "Vision" written by Marr D. and published from W. H. Freeman and Company New York in 1982. In accordance with this method, correspondences are established between associated dots respectively of the right and left images under the following conditions such that differences between positions of the dots are treated as disparity to restore a solid image.

(1) Compatibility: The corresponding points have an analogous property (for example, a black dot matches only a black dot).

(2) Uniqueness: One point on an image matches only one dot on another image (matching is not established for any other dots).

(3) Continuity: The disparity of the matches varies smoothly almost everywhere over the image.

Marr refers to a disadvantage of this method, namely, a wrong correspondence may possibly occur between dots in a few cases. To remove the difficulty, there has been proposed a method in which boundary lines (zero-crossing lines) between bright and dark domains respectively of the right and left images are obtained by a filter having three different spatial frequency characteristics. Next, correspondences are established between the boundary lines associated with images attained by an identical spatial frequency filter so as to produce a total or sum of disparity for each dot. Reference is made to pages 122 to 140 of "Vision" written by Marr D. and published by W. H. Freeman and Company New York in 1982. Moreover, in the "Sep./Oct. Issue of Optical Engineering" (Vol. 23, No. 5 (1984)), Nishihara has proposed a method which has reduced the difficulty of the above-described method in that disparity cannot be easily attained for an image having a small number of characteristic points because of an insufficiency of boundaries between bright and dark regions.

In the Nishihara method, virtual random dots are arranged in the overall original image to increase the number of virtual boundaries between bright and dark zones. In U.S. Pat. No. 4,842,411 (1989), Wood proposed a method in which an artificial texture is formed on an image of an object such that a solid shape of the object is examined on the basis of difference between appearances of the texture respectively viewed by the right and left eyes. In a broad sense, this method can be considered to visually increase the characteristic points of the image.

In addition to the methods above, is a known method of reconstructing a shape of an object in a three-dimensional fashion by use of dynamic programming. In this method, there is an apparatus used including right and left lenses for producing images of an object equivalent to pictures of the object developed when the object is viewed respectively by the right and left eyes. Triangles formed by the centers of the respective lenses and arbitrary points of the object form an epipolar plane. Lines of intersection, namely, epipolar lines, are created between the epipolar plane and planes of the right and left images. According to a property that when a point on either one of the right or left epipolar lines has a corresponding point on the remaining epipolar line of the image, these points exist on the paired epipolar lines, and the problem of handling corresponding points between the right and left two-dimensional (2D) images is simplified to a problem treating corresponding points in a one-dimensional manner. That is, the problem of attaining disparity data between the right and left 2D images is reduced to a problem of dynamic programming which defines a cost function related to combinations of points on each epipolar line of the left image and points on each epipolar line of the right image so as to obtain a pair of points which minimizes the value of the cost function.

According to Ohta and Kanade, the cost function is re-defined to include the three conditions of Marr et al. to thereby reconstruct a 3D contour of a natural image. Reference is to be made to "Ohta Y. and Kanade T., IEEE Trans. Pattern Analysis and Machine Intelligence, PAMI-7(2): 139–154, Mar (1985)". Moreover, in the U.S. Pat. No. 5,179,441 (1993), Charles H. Andersen and Lary H. Mathies have proposed a method in which a window is formed in a two-dimensional (2D) manner centered on a representative point on an epipolar line.

For an image of each of the corresponding windows of the right and left images, respectively, a difference between the right image and an image is obtained by shifting the left image in the x-axis direction to compute a correlation between the images. Disparity data is thereby decided according to the magnitude of the obtained correlation. Based on the disparity data, the method of Andersen and Mathies applies the method of Ohta and Kanade to the reconstruction of the contour. It can be considered that this method enhances the characteristic of matching with respect to the results of correspondences associated with adjacent epipolar lines.

The conventional method of segmenting a reference image from an input image (Japanese Patent Laid-Open Hei-2-156387) is limited to only two-dimensional images and hence cannot be applied to a case where a three-dimensional reference image stored beforehand is required to be separated from an input three-dimensional image.

Furthermore, according to the conventional methods above, in order to remove background noise, a filtering process is conducted to compute geometric mean values of the input image and an image created by inversely transforming a local Feuder transform of an image portion to be segmented from the input image. Consequently, when processing an image in which the bright and dark portions thereof seem to be inverted (in the natural environment, for example, when the target object exists in front of an object such as a wall having a uniform lightness), there is a problem in that the segmentation cannot be appropriately executed.

With the method proposed by Fukushirna et at. (Fukushima K., Biol. Cybern. 55. 5–15(1986) and Fukushima K. and Imagawa T., Neural Networks, Vol. 6, 33–41 (1993)), there can be obtained an advantageous effect similar to that of the present invention by treating the right and left images in an independent fashion. However, since correspondences between the images obtained respectively by the right and left eyes are completely independent of each other, there arises a problem. Namely, even when there does not exist any image which corresponds to the right or left image, a wrong image may possibly be segmented. Moreover, in order to expand the model proposed by Fukushima to process three-dimensional images, it is necessary to provide means for obtaining corresponding points between the right and left images and detecting disparity data therebetween.

Nishihara has proposed a method by developing the method of Marr and Poggio (Nishihara H. K., Sep./Oct. Issue of Optical Engineering, Vol. 23, No. 5, (1984)). This method has a problem associated with a procedure of arranging random dots on a real image having an insufficient number of characteristic point. Namely, when correct disparity data cannot be obtained, it is impossible to appropriately restore the contour of the object in a three-dimensional manner. In addition, according to the method proposed by Wood and Nashua (George A. Wood, N.H., U.S. Pat. No. 4,842,411 (1989)), characteristic lines are obtained on an image surface for a real image. However in an image including projection of a flat plate the significant discrepancy cannot be obtained between texture formed on the surface respectively of the right and left images and hence it is impossible to appropriately attain disparity data. This leads to a disadvantage in that the quasi-three-dimensional contour of the object cannot be properly restored.

According to the method of Ohta and Kanada (Ohta Y., and Kanade T., IEEE Trans. Pattern Analysis and Machine Intelligence, PAMI-7(2), pp. 139–154, Mar (1985) and the method proposed by Anderson and Matties (Charles H. Anderson and Larry H. Matties in U.S. Pat. No. 5,179,441 (1993)), when an image includes a line segment in the proximity of the horizontal line, it is difficult to obtain corresponding points indicating correct disparity data for the epipolar lines of the right and left images. This leads to a disadvantage in that the quasi-three-dimensional contour of the object cannot be appropriately reconstructed.

When segmenting a reference image from an input image using the above method of reconstructing a shape of an object in a 3D fashion on the basis of the image of an object equivalent to the pictures developed when the object is viewed respectively by the right and left eyes, it is necessary to first memorize a solid contour reconstructed from the reference image. Estimation is conducted to obtain a memorized image having a contour similar to a solid contour reconstructed from an input image so as to obtain an image analogous to the reference image estimated according to the solid contour reconstructed from the input image. Consequently, since the solid shape is restored only by information of disparity between the right and left images, when a contour of the object cannot be correctly attained in a 3D fashion, there may possibly occur a problem that the segmentation is erroneously achieved. Furthermore, even when the contour of the object is correctly restored in a 3D fashion, in order to obtain template information of the image similar to the reference image according to the input image, it is necessary, for example, to compute quasi-three dimensional correlation between the solid contours respectively of the reference and input images to estimate a shift in position and discrepancy in the direction of depth. Moreover, a judging step is required to decide whether or not the pertinent objects have the same feature. To compute correlation between quasi-three-dimensional images, when each of the images is increased in size, there appears a problem that the number of computation steps as well as the necessary storage capacity are amazingly increased.

SUMMARY OF THE INVENTION

It is therefore an object of the present invention to provide a 3D reference image segmenting method and a 3D reference image segmenting apparatus capable of appropriately segmenting an image using a reduced memory capacity.

To achieve the object in accordance with the present invention, there is provided a three-dimensional reference image segmenting method including an image input step of inputting therefrom images of an object equivalent to those obtained when the object is viewed respectively by a right eye and a left eye, a local Fourier transform computing step of subdividing the right and left input images inputted in the image input step into small areas, computing a Fourier transform for each of the areas, and thereby computing a local Fourier transform image corresponding to the areas of the image, and a matching image estimating step of representing local disparity between the right and left input images in terms of phase difference between the local Fourier transform thereof, and estimating in the input image an image for which the results obtained in terms of phase difference are mutually analogous to those obtained from a reference image beforehand prepared, thereby segmenting only the estimated image from the input image.

According to the present invention, there is also provided a three-dimensional reference image segmenting apparatus including means for inputting images of an object equivalent to those obtained when the object is viewed respectively by a right eye and a left eye, means for subdividing the right and left input images of the reference image into small areas with overlaps allowed therebetween, conducting a Fourier transform for an image of each of the areas, and thereby computing a local Fourier transform corresponding to the areas of the image, storage means for prior storing of local Fourier transforms respectively of right and left images of the reference image, means of attaining predetermined data of a Fourier transform from the right and left local Fourier transforms of the reference image beforehand stored in the storage means, means for estimating an identical object image identical to the reference image according to the local Fourier transforms which are computed by the local Fourier transform computing means, of the input image including the reference image and the predetermined data obtained by the Fourier transform data attaining means, means for computing a local inverse Fourier transforms for the identical object image estimated by the estimating means, and means for achieving computations according to the input image supplied from the image input means and the local inverse Fourier transform computed by the local Fourier transform computing means and obtaining geometric mean values between the images, thereby segmenting from the input image an image matching the reference image also with respect to disparity.

Moreover, according to the present invention, there is further provided a three-dimensional reference image segmenting apparatus including means for inputting images of an object equivalent to those obtained when the object is viewed respectively by a right eye and a left eye, means for subdividing the right and left input images of the reference image into small areas with overlaps allowed therebetween, conducting a Fourier transform for an image of each of the areas, and thereby computing a local Fourier transform corresponding to each of the areas of the image, means for representing disparity between local areas respectively of images obtained when an object is viewed respectively by the right and left eyes in terms of phase difference of the local Fourier transform, means for obtaining a maximum power spectral pattern by computing a sum of a right power spectrum and left power spectrum when the phases of the local Fourier transforms of the images obtained when the object is viewed respectively by the right and left eyes match each other for each spatial frequency, storage means for prior storing of the maximum power spectral pattern of the reference image, means for estimating according to the local Fourier transforms of the input image, the maximum power spectral pattern of the input image, and maximum power spectral pattern of the reference image, a local Fourier transform of an image existing in the input image and having a power spectral pattern analogous to that of the reference image, thereby obtaining a local Fourier transform of an identical object image identical to the reference image, and means for computing a local inverse Fourier transform according to the local Fourier transform estimated by the estimating means, thereby segmenting the reference image from the input image even when the object of the reference image is included in the input image and a positional difference exists in depth direction between the reference image and the object included in the input image.

BRIEF DESCRIPTION OF THE DRAWINGS

The objects and features of the present invention will become more apparent from the following detailed description taken in conjunction with the accompanying drawings in which:

FIG. 3A is a diagram showing reference images in a conventional method of segmenting a 3D reference image from an input image;

FIG. 3B is a diagram showing a result of the method when disparity mismatches for the reference images in which the upper and lower portions respectively indicate an input image and a segmented image;

FIG. 3C is a diagram showing a remit of the method when disparity mismatches for the reference images in which the upper and lower portions respectively indicate an input image and a segmented image;

FIG. 5 is schematic block diagram showing a further embodiment of the 3D reference image segmenting apparatus in accordance with the present invention;

FIGS. 7A and 7B are diagrams of segmentation in the embodiment of FIG. 5 when the position in the depth of the reference image is substantially equal to that of an image to be segmented from the input image and representation of the image is inverted.

DESCRIPTION OF THE PREFERRED EMBODIMENTS

Figure 1:
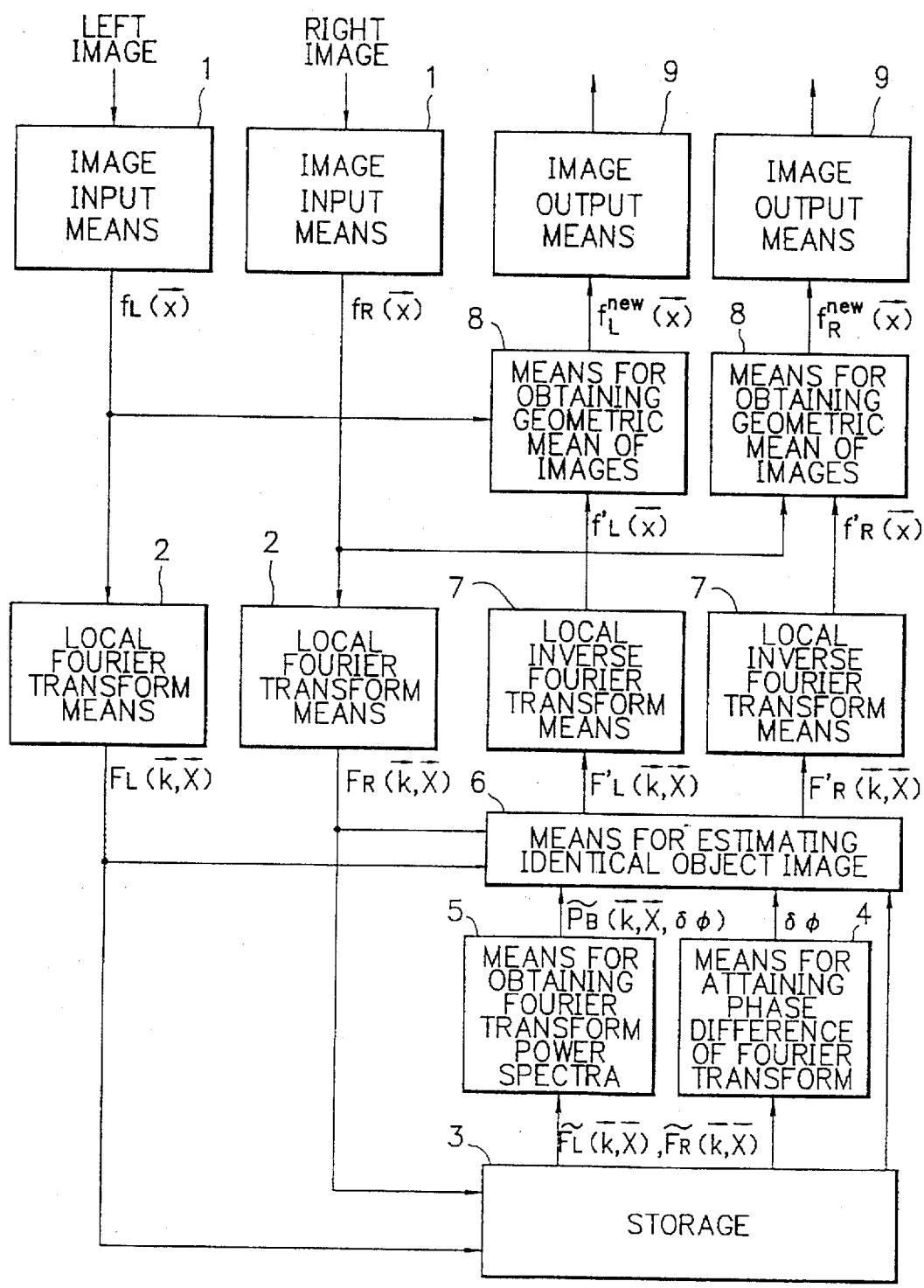
FIG. 1 is a schematic block diagram showing an embodiment of the 3D reference image segmenting apparatus in accordance with the present invention.

Referring now to the drawing, description will be given of embodiments of the 3D reference image segmenting apparatus in accordance with the present invention.

Embodiment 1

FIG. 1 shows and example of a 3D reference image segmenting apparatus in accordance with the present invention. The apparatus includes image input means 1, means for conducting local Fourier transforms 2, a storage 3, means for obtaining phase difference in Fourier transforms 4, means for computing Fourier transform power spectral patterns 5, means for estimating an identical object image 6, means for performing a local inverse Fourier transform 7, means for attaining geometric mean values for images 8, and means for producing and outputting images 9.

A method of creating reference image data will be next described.

First, a right image and a left image respectively associated with images produced when a reference image as the target of segmentation is viewed respectively by the right and left eyes are inputted via the image input means 1, respectively. Subsequently, in the local Fourier transform means 2, the inputted right and left images of the reference image are subdivided into small regions with overlapped portions allowed therebetween, and then each of the partitions is subjected to Fourier transform. The local Fourier transform is expressed as follows.

$$F\mu(\vec{k}, \vec{X}) = \sum_x f\mu(\vec{x}) G\sigma(\vec{x} - \vec{X}) \exp[-i\vec{k}(\vec{x} - \vec{X})] \quad (1)$$

$$G\sigma(\vec{x} - \vec{X}) = \exp\left[-\frac{1}{2\sigma^2}\{(\vec{x} - \vec{X})^2 + (y - Y)^2\}\right]$$

$$(x, y) = \vec{x}, (X, Y) = \vec{X}$$

where μ indicates separation of the left an right images, $f\mu(\vec{x})$ represents an input image, $G\sigma(\vec{x}-\vec{X})$ denotes a Gaussian window, and $\vec{x}$ stands for values of the central coordinates of the Gaussian window in the space of the input image. Results attained from expression (1) are stored in the storage 3.

Next, description will be given of a method of segmenting from the input image an image of an object identical to that of the reference image.

First, a right image and left image respectively associated with images produced when an input image including a reference image is viewed respectively by the right and left eyes are inputted, via the image input means 1, respectively. Subsequently, in the local Fourier transform means 2, the right and left images are respectively subjected to the local Fourier transform according to expression (1). Results of the transform are delivered to the object estimating means 6.

Subsequently, description will be briefly given of algorithms employed respectively by the means for obtaining the phase difference of the left and right Fourier transforms 4 and means for computing patterns of power spectra 5. Assuming that the phase difference between the images respectively obtained by conducting the local Fourier transform for the right and left images is δφ, and both images have substantially the same size, the following relationship is obtained:

$$F_R(\vec{k},\vec{X}) = F_L(\vec{k},\vec{X}) \exp(-i\delta\phi) \quad (2)$$

On the other hand, when a disparity $\vec{\Delta}$ exists between the right and left images, mainly, in a case of $f_R(\vec{x}) = f_L(\vec{x} - \vec{\Delta})$, the local Fourier transform of the right image can be represented using the local Fourier transform of the left image as follows:

$$F_R(\vec{k},\vec{X}) = F_L(\vec{k},\vec{X}) \exp(-i\vec{k}\vec{\Delta}) \quad (3)$$

Since expression (2) is equal to expression (3) when a condition $\delta\phi = \vec{k}\vec{\Delta}(mod2\pi)$ is satisfied, the disparity $\vec{\Delta}$ can be rendered from the phase difference δφ between the local Fourier transforms of the right and left images. Furthermore, a Fourier transform power spectrum is attained according to the sum of the local Fourier transforms of the right and left images and phase terms as follows.

$$P_B(\vec{k},\vec{X},\delta\phi) = |F_L(\vec{k},\vec{X}) + F_R(\vec{k},\vec{X}) \exp(i\delta\phi)|^2 \quad (4)$$

Substituting expression (3) in expression (4), the left term $P_B(\vec{k},\vec{X},\delta\phi)$ takes the maximum value when a condition $\delta\phi = \vec{k}\vec{\Delta}(mod2\pi)$ is satisfied. Namely, disparity $\vec{\Delta}$ can be attained from the Fourier transform power spectral pattern. The phase difference means 4 computes δφ from expression (2), whereas the pattern obtaining means 5 acquires $P_B(\vec{k},\vec{X},\delta\phi)$ according to expression (4).

The estimating means 6 conducts an estimation on the basis of the local Fourier transform of the reference and input images, respectively, kept in the storage 3 to produce a local Fourier transform from an image of an object identical to that of the reference image. Assume now that the respective local Fourier transform of the right and left images associated with the reference image are expressed as $\tilde{F}\mu(\vec{k},\vec{X})$, the local Fourier transform respectively of the right and left images associated with the input image are represented as $F\mu(\vec{k},\vec{X})$, and the estimated local Fourier transform (images) respectively of the right and left images are denoted as $F\mu'(\vec{k},\vec{X})$. For the estimation of the images $F\mu'(\vec{k},\vec{X})$ in this situation, there can be considered, for example, three kinds of algorithms as follow.

First algorithm

According to the local Fourier transforms respectively of the right and left images accumulated in the storage 3, there is obtained by the phase difference means 4 the value of $\delta\phi_1$, satisfying $$\tilde{F}_R(\vec{k},\vec{X}) = \tilde{F}_L(\vec{k},\vec{X}) \exp(-i\delta\phi_1)$$

Based on the obtained $\delta\phi_1$ and the local Fourier transform of the input image, the estimation means 6 computes the following expressions and outputs results therefrom:

$$F'_R(\vec{k},\vec{X}) = F_R(\vec{k},\vec{X}) \exp(-i\delta\phi_1)$$

$$F'_L(\vec{k},\vec{X}) = F_L(\vec{k},\vec{X}) \exp(-i\delta\phi_1)$$

Second algorithm

In a manner similar to that of the first algorithm, there is obtained the value of $\delta\phi_1$ satisfying $$\tilde{F}_R(\vec{k},\vec{X}) = \tilde{F}_L(\vec{k},\vec{X}) \exp(-i\delta\phi_1)$$

According to the obtained $\delta\phi_1$, values of the amplitude of the local Fourier transform of the reference image, and the local Fourier transform of the input image, the estimation means 6 computes the following expressions and outputs results therefrom.

$$F_R'(\vec{k}, \vec{X}) = |\tilde{F}_R(\vec{k}, \vec{X})| \, w \, (F_L, F_R) \exp(-i\delta\phi_1) \quad (6)$$

$$F_L'(\vec{k}, \vec{X}) = |\tilde{F}_R(\vec{k}, \vec{X})| \, w \, (F_L, F_R) \exp(-i\delta\phi_1)$$

$$w(Z_1, Z_2) = \frac{Z_1}{|Z_1|} \; ; \epsilon < |Z_1|, \epsilon < |Z_2|$$

$$= 0; \text{otherwise}$$

where ε indicates a small positive constant. Expression (6) represents a kind of local spatial frequency filtering. As a result, any background pattern having a local spatial frequency component not included in the reference image is removed by the filtering process. For example, even when $F\mu(\vec{k},\vec{X})$ takes a large value for a certain combination ($\vec{k},\vec{X}$) due to a background pattern, $\tilde{F}\mu(\vec{k},\vec{X}) \approx 0$ results from the filtering step. This means that the component $F\mu(\vec{k},\vec{X})$ becomes 0. Moreover, according to expression (6), the phase of $F_R(\vec{k},\vec{X})$ is set so as to provide the same phase difference, namely, the same disparity associated with the right and left images of the reference image is provided for $F_L(\vec{k},\vec{X})$. If the input and reference image is produced from an identical object, the following relationships will hold:

$$F_R(\vec{k},\vec{X}) = F_L(\vec{k},\vec{X})exp(-i\delta\phi_1)$$

$$F'_L(\vec{k},\vec{X}) = F_L(\vec{k},\vec{X})exp(-i\delta\phi')$$

$$F'_R(\vec{k},\vec{X}) = F_R(\vec{k},\vec{X})exp(-i\delta\phi') \quad (7)$$

where $\delta\phi_1$ indicates a phase difference due to disparity and $\delta\phi'$ stands for a phase difference related to positional difference in a plane perpendicular to the depth direction between the input and reference images. The local Fourier transforms of the input image are not changed by the process according to expression (6). That is, the following conditions are satisfied and the input image itself is obtained.

$$F'_R(\vec{k},\vec{X}) = F_R(\vec{k},\vec{X})$$

$$F'_L(\vec{k},\vec{X}) = F_L(\vec{k},\vec{X}) \quad (8)$$

When disparity data varies between the input and reference images, phase components of the local Fourier transforms of the input image are altered by the process of expression (6). As a result an image is reproduced by the means 7 at a position different from that of the target image in the input image. In consequence, as a result of processing by the means 8, the segmentation is not affected when disparity data varies between the input and reference images.

Third algorithm

According to the local Fourier transforms respectively of the right and left images kept in the storage 3, Fourier transform power spectral patterns $\tilde{P}_B(\vec{k},\vec{X},\delta\phi)$ are obtained for the reference image by the means 5. Based on $\tilde{P}_B(\vec{k},\vec{X},\delta\phi)$ and the local Fourier transforms of the input image, there are attained by the means 6 a local Fourier transform $F_L(\vec{k},\vec{X})$ and $F_R(\vec{k},\vec{X})$ and positive auxiliary functions $\lambda_L$ and $\lambda_R$ which minimize the values respectively of the following energy functions $E_R$ and $E_L$:

$$E_R = \sum_{\delta\phi} (|F_L(\vec{k},\vec{X}) + F_R'(\vec{k},\vec{X})exp(i\delta\phi)| - \lambda_R \tilde{P}_B(\vec{k},\vec{X},\delta\phi))^2 \quad (9)$$

$$E_L = \sum_{\delta\phi} (|F_L'(\vec{k},\vec{X}) + F_R(\vec{k},\vec{X})exp(i\delta\phi)| - \lambda_L \tilde{P}_B(\vec{k},\vec{X},\delta\phi))^2$$

In the description above, when the first or second algorithm is adopted, the means for computing spectral patterns 5 can be dispensed with. When the third algorithm is employed, the means for attaining phase difference 4 is unnecessary.

Furthermore, when a particular disparity $\vec{\Delta}$ is externally supplied according to the first algorithm, an image having a particular disparity can be directly separated from the input image by computing the phase difference $\delta\phi_1$ associated with the disparity data $\vec{\Delta}$.

Next, according to local Fourier transforms $F_L(\vec{k},\vec{X})$ and $F_R(\vec{k},\vec{X})$, inverse transform images $f'_L(\vec{x})$ and $f'_R(\vec{x})$ are obtained from the following expression by the means 7:

$$f\mu'(x)G\sigma(\vec{x}-\vec{X}) = \frac{1}{N_2} \sum_k F\mu'(\vec{k},\vec{X})exp(i\vec{k}(\vec{k}-\vec{X})) \quad (10)$$

$$F\mu'(\vec{x}) = \frac{\sum_{\vec{x}} G\sigma(\vec{k}-\vec{X})}{\sum_{\vec{x}} G\sigma(\vec{x}-\vec{X})}$$

where N is a normalization constant. Next, in the means 8, geometric mean values are attained according to the inverse transform images $F'_L(\vec{x})$ and $F'_R(\vec{x})$ of the input images $f_L(\vec{x})$ and $f_R(\vec{x})$ as follows:

$$f_L^{new}(\vec{x}) = \sqrt{f_L(\vec{x}) \cdot f_L'(\vec{x})} \quad (11)$$

$$f_R^{new}(\vec{x}) = \sqrt{f_R(\vec{x}) \cdot f_R'(\vec{x})}$$

The operation to compute the geometric mean values is equivalent to segmenting the expected image $f\mu'(\vec{x})$ from the input image $f\mu(\vec{x})$. The background pattern not included in the reference image is removed as a result of this process. Furthermore, even when the disparity data varies between an image of an object included in the input image and that of the reference image, the background pattern is removed by the segmenting operation according to expression (11).

Subsequently, the attained images respectively of $f_L^{new}(\vec{x})$ and $f_R^{new}(\vec{x})$ are delivered from the means 9. In addition, supplying the images of $f_L^{new}(\vec{x})$ and $f_R^{new}(\vec{x})$ as inputs to the system, the above procedure is repeatedly executed to segment only the reference image from the input image.

Embodiment 2

Figure 2:
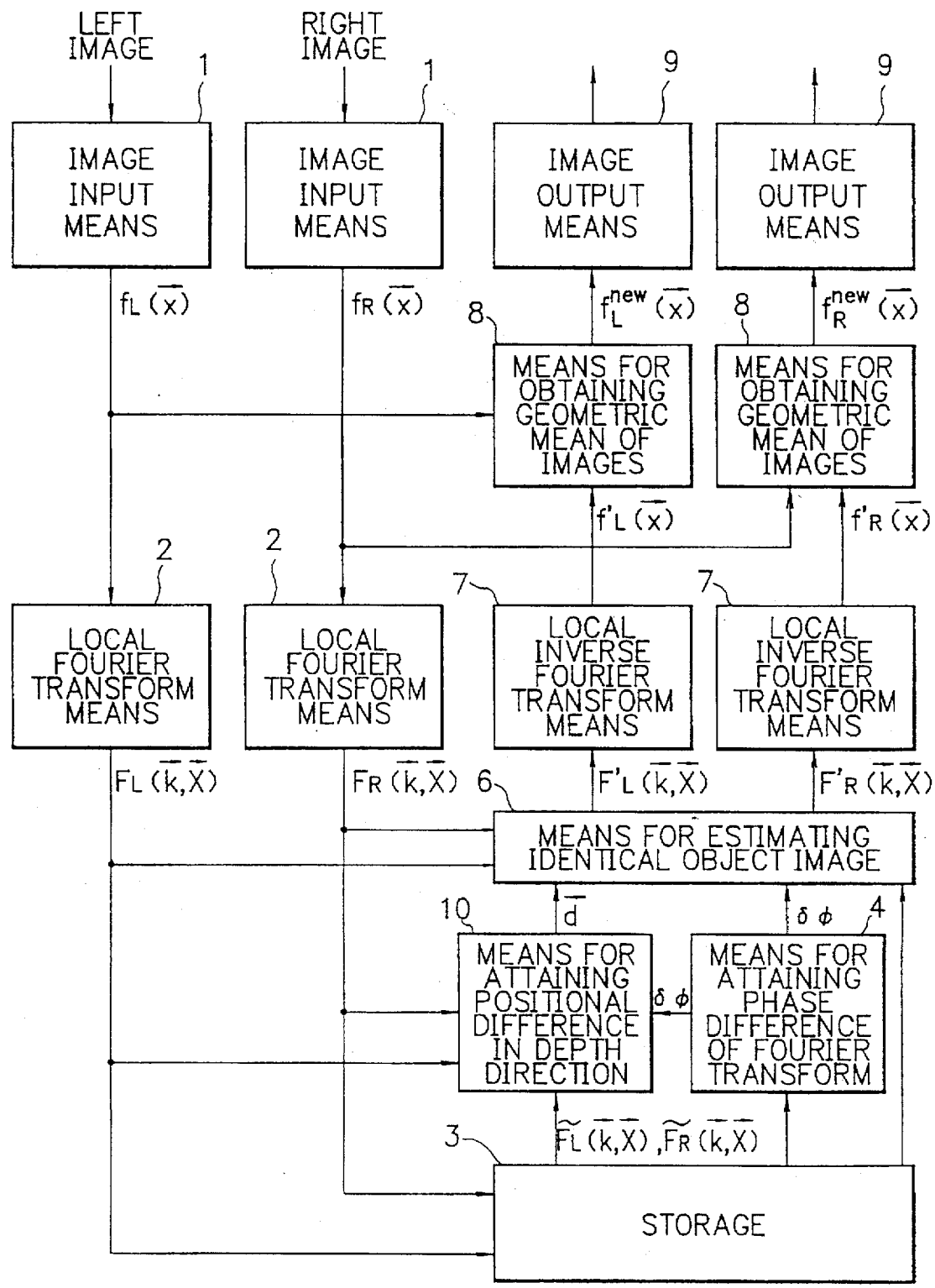
FIG. 2 is a block diagram showing another embodiment of the 3D reference image segmenting apparatus in accordance with the present invention.

In the first embodiment, although the object image of the reference image is included in the input image, when the position varies therebetween in depth direction, it is necessary to perform correction with respect to the positional difference in depth direction. FIG. 2 shows an example 3D reference image segmenting system including means of correcting the positional difference in depth direction. The configuration of FIG. 2 includes image input means 1, means for computing a local Fourier transform 2, a storage 3, means for obtaining a phase difference of Fourier transforms 4, means for attaining positional difference in depth direction 10, means for estimating an identical object image 6, means for computing a local inverse Fourier transform 7, means for obtaining a geometric mean between images, and means of outputting images 9.

First, in the same manner as for the first embodiment, right and left images equivalent to those obtained when the reference image as the target of segmentation is viewed respectively by the right and left eyes are supplied via the image input means 1. Next, in the means 2, a local Fourier transform is executed for the images to store results of the transform in the storage 3. Thereafter, also in the same manner as for the first embodiment, right and left images equivalent to those obtained when the input image including the reference image is viewed respectively by the right and left eyes are delivered via the image input means 1.

Description will now be given of an algorithm adopted in the means for attained positional difference in depth direction 10. Assume that $f\mu(\vec{x})$ has the following relationships:

$$f_R(\vec{x}) = f_L(\vec{x} - \vec{\Delta})$$

$$f_R(\vec{x}) = f_L(\vec{x} - \vec{\Delta}') \quad (12)$$

$$\vec{\Delta}' = \vec{\Delta} + \vec{d}$$

where $\vec{d}$ indicates a virtual disparity difference due to the positional difference in depth direction between the reference and input images. Under the above conditions, the following relationships approximately hold between the local Fourier transforms of the reference and input images accumulated in the storage 3:

$$F_R(\vec{k}, \vec{X}) = F_L(\vec{k}, \vec{X}) exp[-i\vec{k}(\vec{\Delta}(\vec{x}))] = F_L(\vec{k}, \vec{X}) exp(-i\delta\phi_1)$$

$$F_R(\vec{k}, \vec{X}) = F_L(\vec{k}, \vec{X}) exp[-i\vec{k}(\vec{\Delta}(\vec{X}) + \vec{d})] = F_L(\vec{k}, \vec{X}) exp(-i\delta\phi_1 - i\vec{k}\vec{d})$$

Assume that the image of the object to be segmented has not been deformed, i.e., is kept unchanged. It is then to be appreciated that the value of $\vec{d}$ satisfying the relationships (13) for any values of $\vec{k}$ and $\vec{X}$ is obtained as the virtual disparity difference $\vec{d}$.

Referring now to the means of attaining a positional difference in depth direction 10, description will be given of means 6 to attain a local Fourier transform of an image of the object from which the reference image is produced. First, disparity data of the local Fourier transforms of the reference image accumulated in the storage 3 is computed in terms of phase difference $\delta\phi_1$ by the means 4. Next, in the means 10, there is obtained the value of $\vec{d}$ satisfying the relationships (13) for any $\vec{k}$ and $\vec{X}$. In the estimation means 6, through substitution of disparity according to $\vec{\Delta}' = \vec{\Delta} + \vec{d}$, namely, substitution of a phase difference as $\delta\phi' = \delta\phi_1 + \vec{k}\vec{d}$, local Fourier transforms are computed for the image of the object identical to that of the reference image according to the algorithm used in the first embodiment.

Subsequently, in the same manner as for the embodiment 1, the obtained transform images are processed by the means 7 according to the relationships (10) to obtain inverse Fourier transform images thereof. Next, in the means 8, geometric mean values are computed for the input image and local inverse Fourier transform images related thereto according to the relationships (11). Values resulting from the means 8 are sent to the means 9 to be delivered therefrom. As described in conjunction with the first embodiment, using the output results as new input images, the procedure above is repeatedly carried out to segment only the reference image from the input image.

According to the present invention, as described above, disparity data between the right and left images are represented as the phase difference of Fourier transforms so as to expand the system to treat 3D images. This leads to an advantageous feature that only the 3D reference image stored beforehand in the system can be separated from an input 3D image by estimating from the input image an image of an object identical to that of the reference image. According to the present invention, the segmentation can be effectively performed even when the above positional difference exists in a plane perpendicular to the direction of depth of the target object. Moreover, this applies to the positional difference in the direction of depth of the target object.

In the method of segmenting a 3D reference image from an input image in accordance with the present invention, the method of segmenting a 2D reference image from an input image (described in the Japanese Patent Laid-Open Hei-2-156387 entitled "Video Signal Processing Method") is expanded to handle 3D images. For the input and reference images, phase difference data items are computed between the respective Fourier transforms of the right and left images thereof so as to estimate from the input image an object image matching the reference image also with respect to disparity. This enables appropriate separation of only the target image from the input image, even when images other than the reference image are included in the input image. Reference is to be made to FIG. 3B. Furthermore, in a system including means of estimating positional difference in depth direction, even when there exists any positional difference in the depth direction between the reference image and the image to be segmented from the input image, it is possible to correctly separate only the reference image from the input image.

Figure 4A:
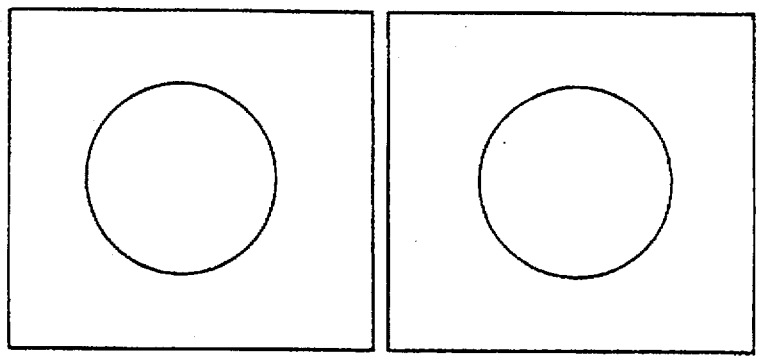
FIG. 4A is a diagram showing reference images in a conventional method of segmenting a 3D reference image from an input image with the bright and dark zones inverted as compared with the images of FIGS. 3A to 3C.
Figure 4B:
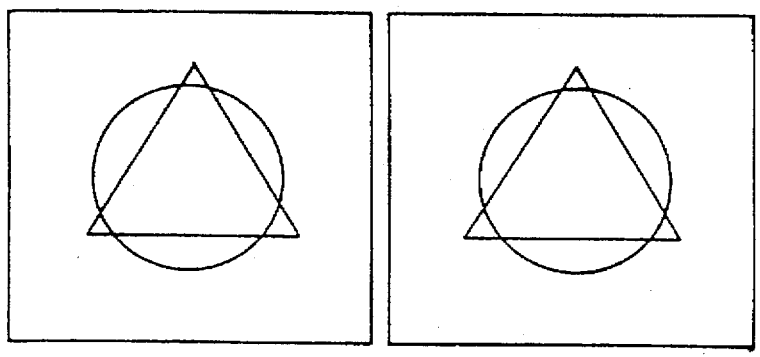
FIG. 4B is a diagram showing a result of the method when disparity matches for the reference images in which the upper and lower portions respectively indicate an input image and a segmented image.
Figure 4B:
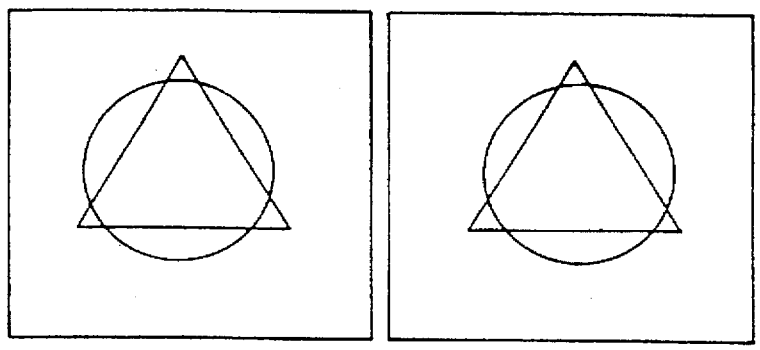

On the other hand, an image having a disparity pattern identical to that of the memorized image is estimated according to the input image. Namely, the identical image, also with respect to disparity, is thus estimated to be segmented from the input image. Consequently, when there exists positional difference in depth direction, as shown in FIG. 3C, between the stored image and the image which is the target image in the input image, there arises a drawback that the segmentation cannot be appropriately achieved. According to the method of the present invention, to overcome the difficult, there is a means for estimating the positional difference in depth direction to conduct appropriate correction. In the computation of correlations between images represented in a quasi-three-directional manner, when the images are increased in size, the number of computation steps becomes very large, which has disadvantage of requiring a large storage capacity. Furthermore, to remove noise from the input image, there is a filtering process for the input image. Consequently, when the images include bright and dark portions in an inverted fashion as shown in FIGS. 4A to 4B when compared with those shown in FIG. 3A to 3B, there arises a problem that the segmentation cannot be appropriately achieved.

According to the present invention, to expand the system to treat 3D images, disparity data between the right and left images is represented in terms of phase difference data of the Fourier transforms as described above. However, in the means for estimating the same object image 6, only quasi-two-dimensional image information is required to be computed to attain from the input image a local Fourier transform of the image decided to be identical to the reference image. Consequently, in comparison with the method of directly processing quasi-3D contours of objects, the method of the present invention has an advantageous feature that the number of computation steps is reduced.

Furthermore, according to the present invention, it may possible occur that the disparity data associated with a line segment existing in the proximity of the horizontal line is not expressed exactly. However, in a case where the local Fourier transform of an image to be segmented from the input image is created according to information items respectively of the reference and input images, not only information of disparity data items of the right and left images, but also the values of the magnitude of the power spectra are involved in the process. Consequently, even in a portion for which disparity data is not exactly expressed, it is possible to segment from the input image an image of an object having a power spectral pattern analogous to that of the reference image in the input image.

Third embodiment

FIG. 5 shows the configuration of an embodiment of the 3d image segmenting apparatus in accordance with the present invention. The embodiment includes screen image input means 11, means for computing a local Fourier transform 12, means for expressing disparity data in the form of phase difference patterns 13, means for obtaining maximum power spectral pattern 14, a storage 15, means for attaining a local Fourier transform of an identical object image 16, means for computing a local inverse Fourier transform 17, and means for producing images 18.

Referring now to FIG. 5, description will be given of a method of creating reference image data. Since the procedure of the first embodiment to obtain disparity data $\vec{\Delta}$ from the phase difference $\delta\phi$ between the local Fourier transforms respectively of the right and left images is also applied to this embodiment, redundant description thereof will be unnecessary. The sum of the local Fourier transforms respectively of the right and left images and the phase term is represented as follows:

$$F_B(\vec{k},\vec{X},\delta\phi) = F_L(\vec{k},\vec{X}) + F_R(\vec{k},\vec{X})exp(i\delta\phi) \quad (14)$$

From $F_B(\vec{k},\vec{X},\delta\phi)$, the Fourier transform power spectrum is obtained as follows:

$$P_B(\vec{k},\vec{X},\delta\phi) = |F_L(\vec{k},+e,rar+ee)+F_R(\vec{k},\vec{X})exp(i\delta\phi)|_2 \quad (15)$$

Inserting expression (3) in expression (15), $P_B(\vec{k},\vec{X},\delta\phi)$ takes the maximum value when $\delta\phi=\vec{k}\vec{\Delta}(mod2\pi)$ holds. Disparity $\vec{\Delta}$ can also be obtained from the pattern of the obtained spectrum. The means 13 for expressing disparity data in the form of phase difference patterns is the means to compute expression (14), whereas the means 14 for obtaining the maximum power spectral pattern is the means to compute the power spectral pattern $P_B^{max}(\vec{k},\vec{X})$ when the condition $\delta\phi=\vec{k}\vec{\Delta}(mod2\pi)$, which equalizes expression (2) with expression (3) is satisfied. The pattern $P_B^{max}(\vec{k},\vec{X})$ of the power spectrum attained for the reference image is stored in the storage 15.

Referring next to FIG. 5, description will be given of the method of segmenting from an input image an image of an object identical to that of the reference image.

First, right and left images equivalent to those obtained when an input image including the reference image is viewed respectively by the right and left eyes are supplied from the image input means 11. For each of these images, a local Fourier transform is then calculated according to expression (1). In the means 11, disparity data between the right and left images is represented as a phase difference pattern according to expression (14) to send the pattern to the means 16. According to the results attained by the means 13, the pattern $P_B^{max}(\vec{k},\vec{X})$ of the power spectrum for the input image is computed by the means 14 to deliver to the pattern to the means 16.

Description will now be given of the means 16 of computing a local Fourier transform of the same object image. The means 16 receives as inputs thereto the maximum power spectral pattern of the reference image stored in the storage 15, the maximum power spectral pattern of the input image, and the pattern of the phase difference representing disparity between the right and left images of the input image to obtain therefrom a local Fourier transform of an image having a power spectral pattern identical to that of the reference image in the input image. Assume that the maximum power spectral pattern of the reference image, the maximum power spectral pattern of the input image, and the pattern of phase difference representing disparity between the right and left images of the input image are represented as $P_B^{max.Ref}(\vec{k},\vec{X})$, $P_B^{max.inp}(\vec{k},\vec{X},\delta\phi)$, and $F_B(\vec{k},\vec{X},\delta\phi)$, respectively. In addition, assume that the pattern representing disparity between the right and left images of the image to be segmented from the input image is expressed as $\hat{F}_B(\vec{k},\vec{X},\delta\phi)$. Under these above conditions, $\hat{F}_B(\vec{k},\vec{X},\delta\phi)$ is represented as follows:

$$\hat{F}_B(\vec{k},\vec{X},\delta\phi) = F_B(\vec{k},\vec{X},\delta\phi); P_B^{max.inp}(\vec{x},\vec{X}) \leq \theta \quad (16)$$

$$\hat{F}_B(\vec{k},\vec{X},\delta\phi) = \frac{P_B^{max.Ref}(\vec{x},\vec{X})}{P_B^{max.inp}(\vec{x},\vec{X})} F_B(\vec{k},\vec{X},\delta\phi); \text{ otherwise}$$

where, $\phi$ stands for a threshold value of the output $R_B^{max}(\vec{k},\vec{X})$. Because of $\phi$, in a case where an object image exists for the reference image and such an associated object image is missing for the input image, there is attained a relationship $\hat{F}_B(\vec{k},\vec{X},\delta\phi)=F_B(\vec{k},\vec{X},\delta\phi)$. Conversely, in a case where an object image exists for the input image and such an associated object image is missing for the reference image, the left side of the expression (16) becomes smaller, which leads to an advantageous effect of removing background noise and the like.

Assume that $\delta\phi$ takes n discrete values in a range from $-\pi$ to $\pi$. Then, expression (14) is represented in the matrix form as follows:

$$F_B = U \left| \frac{F_L}{F_B} \right| \quad (17)$$

$$U = \begin{vmatrix} 1 & 0 & \cos\delta\phi_1 & -\sin\delta\phi_1 \\ \cdot & \cdot & \cdot & \cdot \\ \cdot & \cdot & \cdot & \cdot \\ \cdot & \cdot & \cdot & \cdot \\ 1 & 0 & \cos\delta\phi_n & -\sin\delta\phi_n \\ 0 & 1 & -\sin\delta\phi_1 & \cos\delta\phi_1 \\ \cdot & \cdot & \cdot & \cdot \\ \cdot & \cdot & \cdot & \cdot \\ \cdot & \cdot & \cdot & \cdot \\ 0 & 1 & -\sin\delta\phi_n & \cos\delta\phi_n \end{vmatrix}$$

where, $$F_L = \begin{bmatrix} R_e(F_L) \\ I_m(F_L) \end{bmatrix}, \quad F_R = \begin{bmatrix} R_e(F_R) \\ I_m(F_R) \end{bmatrix} \quad F_B = \begin{bmatrix} R_e(F_B)_1 \\ \cdot \\ \cdot \\ R_e(F_B)_n \\ I_m(F_B)_1 \\ \cdot \\ \cdot \\ I_m(F_B)_n \end{bmatrix}$$

According to $F_B(\vec{k},\vec{X},\delta\phi)$ calculated from expression (16), the local Fourier transforms of the right and left images can be obtained by use of a general inverse matrix $U^+$ of matrix $U$ as follows:

$$|\hat{F}_L, \hat{F}_R| = U^+\hat{F}_B \quad (18)$$

The general inverse matrix $U^+$, for example, of an m-by-n matrix U is an m-by-n matrix satisfying the following conditions:

(a) $UU^+U=U$ (b) $U^+UU^+=U^+$ (c) $(UU^+)^T=UU^+$       (19)

(d) $(U^+U)^T=U^+U$

The means for computing local Fourier transforms pattern of an identical object image 16 is the means to compute the local Fourier transforms of the right and left images of the image to be segmented from the input image according expression (16) and (18).

Subsequently, according to the local Fourier transforms $\hat{F}_L(\vec{k},\vec{X})$ and $\hat{F}_R(\vec{k},\vec{X})$, inverse transform images $\hat{f}_L(\vec{k},\vec{X})$ and $\hat{f}_R(\vec{k},\vec{X})$ are computed from the following expressions:

$$\hat{f\mu}(\vec{x})G\sigma(\vec{x}-\vec{X}) = \frac{1}{N}\sum_{\vec{k}} F\mu(\vec{k},\vec{X})\exp[i\vec{K}(\vec{x}-\vec{X})] \quad (20)$$

$$\hat{f\mu}(\vec{x}) = \frac{\sum_{\vec{x}} \hat{f\mu}(\vec{x})G\sigma(\vec{x}-\vec{X})}{\sum_{\vec{x}} G\sigma(\vec{x}-\vec{X})}$$

where N indicates a normalization constant.

Images of $\hat{f}_L(\vec{k},\vec{X})$ and $\hat{f}_R(\vec{k},\vec{X})$ thus obtained are then acquired from the image output means 18. Using $\hat{f}_L(\vec{k},\vec{X})$ and $\hat{f}_R(\vec{k},\vec{X})$ as new input images, the above procedure is repeatedly executed to resultantly segment only the image identical to the reference image from the input image.

Figure 6A:
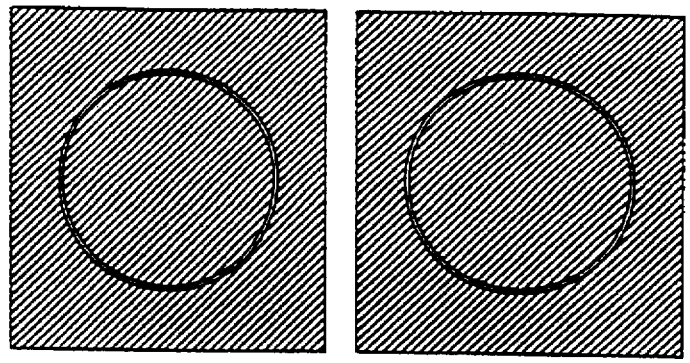
FIGS. 6A and 6B are diagrams of the segmentation in the embodiment of FIG. 5 when a positional difference exists in depth direction between the reference image and an image to be segmented from the input image.
Figure 6B:
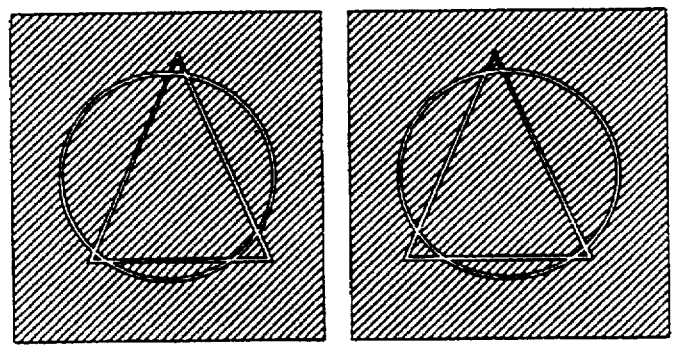
Figure 6B:
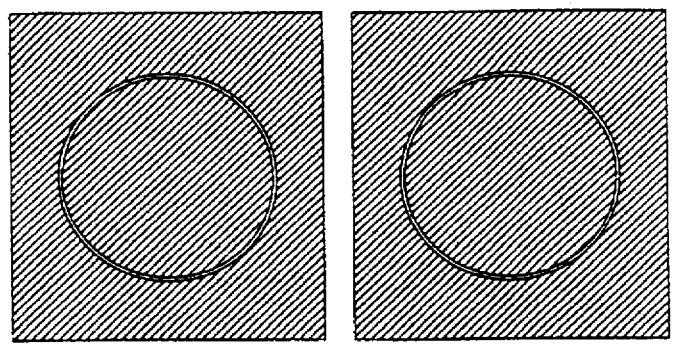

FIGS. 6A and 6B show results of segmentation in the embodiment applied to a case where positional difference exists in the depth direction between the reference image and the image to be segmented from the input image. FIGS. 7A and 7B show results of segmentation in the embodiment applied to a case where positions of the reference image and the image to be segmented from the input image match each other and the images are inverted as compared with those of FIGS. 6A and 6B.

Each image of FIGS. 6A and 6B is produced by reading or scanning by an image reader a photograph of an image presented on a computer display. In FIG. 6B, lines respectively of the circle and triangle are partly interrupted, which has been caused for some reasons when the image is read by the image reader. Namely, the complete circle and triangle are presented on the computer display. In this connection, the input images of FIGS. 3A to 3C are also completely displayed, namely, the respective lines are continuous on the display. However, the segmented images shown in FIG. 3C are similar to those presented on the computer display in which only a few portions of the circle is actually presented in the images.

As described above, in accordance with the present invention, even when there exists positional difference in a depth direction between the reference image and the image to be segmented from the input image, only the target 3D image can be separated therefrom without requiring such operations as estimation for positional difference. That is, the present invention leads to an advantage that a robust segmenting operation can be achieved even when there exists a positional difference in depth direction between the images. Furthermore, as for information of the reference image, it is only necessary to keep the maximum power spectral pattern, which considerably decreases the necessary storage capacity. In addition, even when a target object exists in front of an object like a wall having uniform lightness, the target object can be appropriately segmented therefrom.

While the present invention has been described with reference to the particular illustrative embodiments, it is not to be restricted by those embodiments, but only by the appended claims. It is to be appreciated that those skilled in the art can change or modify the embodiments without departing from the scope and spirit of the present invention.

What is claimed is:

1. A three-dimensional reference image segmenting apparatus, comprising:

means for inputting an image of an object, the image having a left image and a right image, respectively equivalent to those obtained when the object is viewed by a right eye and a left eye, respectively;

means for subdividing the right and left input images of the image into predetermined areas, calculating a Fourier transform for each of the areas;

means for representing a disparity between respective local areas of said left and right image in terms of a phase difference between their respective local Fourier transforms;

means for obtaining a maximum power spectral pattern by computing a sum of a right power spectrum and a left power spectrum when the phases of the local Fourier transform of said left and right images match each other for each spatial frequency;

storage means for storing a maximum power spectral pattern of a reference image;

means for estimating, according to the local Fourier transforms of the input images, the maximum power spectral pattern of the input image, and the maximum power spectral pattern of the reference image, a local Fourier transform of an image existing in the input image and having a power spectral pattern analogous to that of the reference image, thereby obtaining a local Fourier transform of an identical object image identical to the reference image; and means for computing a local inverse Fourier transform according to the local Fourier transform estimated by the estimating means, thereby segmenting the reference image from the input image even when the object of the reference image is included in the input image and a positional difference exists in a depth direction between the reference image and the object included in the input image.

2. A three-dimensional reference image segmenting method, comprising the steps of:

inputting a pixel image including right pixel image and a left pixel image, equivalent to images obtained when an object is viewed by a right eye and a left eye, respectively;

dividing the input right pixel and left pixel images each into a plurality of areas, each represented as $f_\mu(\vec{x})$, where $f_\mu(\vec{x})$ is a value of a pixel at a position identified by a space vector $\vec{x}$, and $\mu$ is a parameter having a value of "L" and "R", respectively, to represent the right and the left images;

calculating, for each $f_\mu(\vec{x})$ area of the right input pixel image and the left input pixel image, a local Fourier transform $F_\mu(\vec{k},\vec{X})$, where $\vec{X}$ is a space vector pointing to a center of a corresponding area $f_\mu(\vec{x})$, and $\vec{k}$ is a space frequency; and segmenting a right and a left target image corresponding to the object from the input images in accordance with the local Fourier transform $F_\mu(\vec{k},\vec{X})$ and a prior stored local Fourier transform $\tilde{F}_\mu(\vec{k},\vec{X})$ of each of the areas in each of a right and left reference image of the object, and such a phase difference $\delta\phi_1$ satisfying a relation that:

$$\tilde{F}_R(\vec{k},\vec{X}) = \tilde{F}_L(\vec{k},\vec{X})exp(-i\delta\phi_1).$$

3. A method according to claim 2, wherein said step of segmenting a right and a left target image comprises the steps of:

calculating, for each of the areas in each of the left input pixel images and right input pixel images, a local Fourier transform equivalent $F'_\mu(\vec{k},\vec{X})$ from the prior stored local Fourier transform $F_\mu(\vec{k},\vec{X})$ and said phase difference on the basis of a local disparity between the input images $f_R(\vec{x})$ and $f_L(\vec{x})$ being expressed as the phase difference;

calculating an inverse Fourier transform image $f'\mu(\vec{x})$, corresponding to the left input pixel images and right input pixel images, from the local Fourier transform equivalents $F'\mu(\vec{k},\vec{X})$; and finding a geometric mean $f\mu(\vec{x})$ between each $f\mu(\vec{x})$ of the left input pixel images and right input pixel images and the corresponding inverse Fourier transform image $f'\mu(\vec{x})$, where $f\mu(\vec{x})$ is an image which only contains an objective image corresponding to the object.

4. A method according to claim 3, wherein the step of calculating a local Fourier transform equivalent $F'\mu(\vec{k},\vec{X})$ comprises the step of:

calculating a local Fourier transform equivalent according to the following equations:

$$F_R'(\vec{k},\vec{X}) = F_R(\vec{k},\vec{X})exp(-i\delta\phi_1), \text{ and}$$

$$F_L'(\vec{k},\vec{X}) = F_L(\vec{k},\vec{X})exp(-i\delta\phi_1).$$

5. A method according to claim 3, wherein the step of calculating a local Fourier transform equivalent $F'\mu(\vec{k},\vec{X})$ comprises the step of:

calculating a local Fourier transform equivalent according to the following equations:

$$F_R'(\vec{k},\vec{X}) = |F_R(\vec{k},\vec{X})|w(F_L,F_R)exp(-i\delta\phi_1), \text{ and}$$

$$F_L'(\vec{k},\vec{X}) = |F_L(\vec{k},\vec{X})|w(F_R,F_L)exp(i\delta\phi_1),$$

where $$w(Z_1,Z_2) = Z_1/|Z_1|: \epsilon < |Z_1|, \epsilon < |Z_2| = 0; \text{ otherwise}.$$

6. A method according to claim 3, wherein the step of calculating a local Fourier transform equivalent $F'\mu(\vec{k},\vec{X})$ comprises the step of:

obtaining the local Fourier transform equivalent $F'\mu(\vec{k},\vec{X})$ from the following equations:

$$E_R \Sigma_{\delta\phi} (|F_L(\vec{k},\vec{X}) + F_R(\vec{k},\vec{X})exp(i\delta\phi)| - \lambda_R P_B(\vec{k},\vec{X},\delta\phi))^2, \text{ and}$$

$$E_L = \Sigma_{\delta\phi} (|F_L'(\vec{k},\vec{X}) + F_R(\vec{k},\vec{X})exp(i\delta\phi)| - \lambda_L P_B(\vec{k},\vec{X},\delta\phi))^2, \text{ where}$$

$$P_B(\vec{k},\vec{X},\delta\phi) = |F_L(\vec{k},\vec{X}) + F_L(\vec{k},\vec{X})exp(i\delta\phi)|^2 \text{ and } \lambda_R \text{ and } \lambda_L \text{ are positive auxiliary functions}.$$

7. A method according to claim 2, wherein said step of dividing each of the left input pixel image and right input pixel image into predetermined areas provides overlaps between said predetermined areas.

8. A method according to claim 2, wherein said step of segmenting a right and a left target image corresponding to the object comprises the step of:

compensating a positional difference in depth direction between the reference image and the target image in the left input pixel image and right input pixel image.

9. A method according to claim 8, wherein said step of compensating a positional difference comprises the steps of:

obtaining an apparent disparity $\vec{d}$ caused by the positional difference in depth direction between the reference image and the target image in the left input pixel image and right input pixel image; and replacing the phase difference $\delta\phi_1$ with $\delta\phi_1 + \vec{k}\vec{d}$.

10. A three-dimensional reference image segmenting apparatus comprising:

means for inputting a right pixel image and a left pixel image equivalent to images obtained when an object is viewed by a right eye and a left eye, respectively;

means for dividing the input right pixel and left pixel images each into a plurality of predetermined areas, each represented as $f_\mu(\vec{x})$ where $f_\mu(\vec{x})$ is a value of a pixel at a position identified by a space vector $\vec{x}$, and $\mu$ is a parameter having a value of "L" and "R", respectively, to represent the right and the left images;

means for calculating, for each $f_\mu(\vec{x})$ area of the right input pixel image and the left input pixel image, a local Fourier transform $F_\mu(\vec{k},\vec{X})$, where $\vec{X}$ is a space vector pointing to a center of a corresponding area $f_\mu(\vec{x})$, and $\vec{k}$ is a space frequency; and means for segmenting a right and a left target image corresponding to the object from the input pixel image by using the local Fourier transform $f\mu(\vec{k},\vec{X})$, a prior stored local Fourier transform $\tilde{F}\mu(\vec{k},\vec{X})$ of each of the predetermined areas in each of a right and a left reference image of the object, and such a phase difference $\delta\phi_1$ satisfying a relation that:

$$\tilde{F}_R(\vec{k},\vec{X}) = \tilde{F}_L(\vec{k},\vec{X})exp(-i\delta\phi_1).$$

11. An apparatus according to claim 10, wherein the means for segmenting a right and a left target image comprises:

means for calculating, for each of the areas in each of the input pixel image, a local Fourier transform equivalent $F'\mu(\vec{k},\vec{X})$ from the local Fourier transform $F\mu(\vec{k},\vec{X})$, the prior stored local Fourier transform and the phase difference on the basis of a local disparity between the input images $f_R(\vec{x})$ and $f_L(\vec{X})$ being expressed as the phase difference;

means for calculating, for each of the input images, an inverse Fourier transform image $f\mu(\vec{x})$ from all the local Fourier transform equivalents $F'\mu(\vec{k},\vec{X})$; and means for finding a geometric mean $f\mu(\vec{x})$ between each $f\mu(\vec{x})$ of the input pixel image and the corresponding inverse Fourier transform image $f'\mu(\vec{x})$, where $f\mu(\vec{x})$ is an image which only contains an objective image corresponding to the object.

12. An apparatus according to claim 11, wherein the means for calculating a local Fourier transform equivalent $F\mu(\vec{k},\vec{X})$ comprises:

means for calculating the following equations:

$F'_R(\vec{k},\vec{X}) = F_R(\vec{k},\vec{X})exp(-i\delta\phi_1)$, and $F'_L(\vec{k},\vec{X})exp(-i\delta\phi_1)$.

13. An apparatus according to claim 11, wherein the means for calculating a local Fourier transform equivalent $F\mu(\vec{k},\vec{X})$ comprises:

means for calculating the following equations:

$F'_R(\vec{k},\vec{X}) = |F_R(\vec{k},\vec{X})|w(F_L,F_R)exp(-i\delta\phi_1)$, and $F'_L(\vec{k},\vec{X}) = |F_L(\vec{k},\vec{X})|w(F_R,F_L)exp(-\delta\phi_1)$, where $w(Z_1,Z_2) = Z_1/|Z_1|: \epsilon < |Z_1|, \epsilon < |Z_2| = 0;$ otherwise.

14. An apparatus according to claim 11, wherein the means for calculating a local Fourier transform equivalent $F\mu(\vec{k},\vec{X})$ comprises:

means for obtaining such the local Fourier transform equivalents $F'\mu(\vec{k},\vec{X})$ as minimizes the following equations:

$E_R = \Sigma_{\delta\phi}(|F_L(\vec{k},\vec{X}) + F'_R(\vec{k},\vec{X})exp(i\delta\phi)| - \lambda_R \hat{P}_B(\vec{k},\vec{X},\delta\phi))^2)$, $E_L = \Sigma_{\delta\phi}(|F'_L(\vec{k},\vec{X}) + F_R(\vec{k},\vec{X})exp(i\delta\phi)| - \lambda_L \hat{P}_B(\vec{k},\vec{X},\delta\phi))^2$, and $\hat{P}_B(\vec{k},\vec{X},\delta\phi) = |F_L(\vec{k},\vec{X}) + F_L(\vec{k},\vec{X})exp(i\delta\phi)|^2$, where $\lambda_R$ and $\lambda_L$ are positive auxiliary functions.

15. An apparatus according to claim 10, wherein the means for dividing the input pixel image into predetermined areas comprises means for providing overlaps between said predetermined areas.

16. An apparatus according to claim 10, wherein the means for segmenting a right and a left target image corresponding to the object comprises:

means for compensating a positional difference in depth direction between the reference image and the target image in the input pixel image.

17. An apparatus according to claim 16, wherein the means for compensating a positional difference comprises:

means for obtaining an apparent disparity d caused by the positional difference in depth direction between the reference image and the target image in the input pixel image; and means for replacing the phase difference $\delta\phi_1$ with $\delta\phi_1 + \vec{k}\vec{d}$.

* * * * *